United States Patent [19]

Hashimoto

[11] Patent Number: 5,075,771
[45] Date of Patent: Dec. 24, 1991

[54] METHOD OF AND APPARATUS FOR OPTIMAL SCHEDULING OF TELEVISION PROGRAMMING TO MAXIMIZE CUSTOMER SATISFACTION

[75] Inventor: Kazuo Hashimoto, Tokyo, Japan

[73] Assignee: Hashimoto Corporation, Tokyo, Japan

[21] Appl. No.: 518,265

[22] Filed: May 7, 1990

Related U.S. Application Data

[63] Continuation of Ser. No. 235,739, Aug. 22, 1988, abandoned.

[30] Foreign Application Priority Data

Aug. 21, 1987 [JP] Japan .................... 62-207776

[51] Int. Cl.⁵ .................................. H04N 7/10
[52] U.S. Cl. ............................ 358/84; 379/92; 455/2; 364/402
[58] Field of Search ............ 358/84; 364/402; 379/92; 455/2

[56] References Cited

U.S. PATENT DOCUMENTS

| | | | |
|---|---|---|---|
| 4,170,782 | 10/1979 | Miller | |
| 4,603,232 | 7/1986 | Kurland et al. | 379/92 |
| 4,706,121 | 11/1987 | Young | 358/142 |
| 4,745,549 | 5/1988 | Hashimoto | 358/84 X |
| 4,787,063 | 11/1988 | Muguet | 364/900 |

FOREIGN PATENT DOCUMENTS 2179771 3/1987 United Kingdom ............ 358/84
2208142 3/1989 United Kingdom .

Primary Examiner—James L. Dwyer
Assistant Examiner—Wing F. Chan
Attorney, Agent, or Firm—Lowe, Price, LeBlanc & Becker

[57] ABSTRACT

In a method of and apparatus for providing a list of optimal television programs for each individual, it is possible to give a computer center a subscriber's complaints about the individual television program list (timing table), through a telephone line or the like, without sending back a subscriber's recording medium to the computer center. The subscriber himself can correct his television timing table to control a TV or VCR when there is any program which he must, or would like to, watch. The subscriber can also specify a priority order to programs recorded during his absence in order to play back the recorded programs within a given time. The program contents of each TV station at any hour specified by the subscriber can be displayed in one picture, so that the subscriber can select any one among all programs of the same kind.

2 Claims, 16 Drawing Sheets

FIG. 8

METHOD OF AND APPARATUS FOR OPTIMAL SCHEDULING OF TELEVISION PROGRAMMING TO MAXIMIZE CUSTOMER SATISFACTION

This application is a continuation application of application Ser. No. 97/235,739, filed Aug. 22, 1988, now abandoned.

BACKGROUND OF THE INVENTION

The present invention relates to a method of and apparatus for editing an individual television program.

In U.S. Pat. No. 4,745,549 by the same applicant, television program scheduling in accordance with customer preferences is carried out by a computer based system. However, improved service to subscribers at remote locations, for instance, disposal of subscriber's complaints and scrolling of the program schedule display, is desirable.

SUMMARY OF THE INVENTION

The present invention relates to improvement of above known method and apparatus.

It is an object of the present invention to provide to a computer center information on subscriber's complaints about an individual television program list (timing table), through a public telephone line or the like, without sending back a subscriber's recording medium to the center when the subscriber at the remote location has a complaint about the list.

It is another object of the present invention to enable the subscriber to correct his television timing table, and thereafter to control a TV or VCR according to the corrected timing table, so as to carry out program change actually caused in daily life or to take into account the occurrence of a program which the subscriber must necessarily watch.

It is another object of the present invention to display all the programs which were recorded during a subscriber's absence, and to enable the subscriber to specify the order of priority of said recorded programs that he is going to watch when he is at home in a given time, thereby to play back said programs within said given time in said specified priority order by controlling order of playback of the VCR.

In the present invention, it is also arranged that the contents of programs of a common kind, for instance, sports programs, can be displayed, so that the subscriber himself can select any one program when there are some programs of the same kind on the air at the same hour. This information is stored in a disc that may be included in an appendix of a magazine, such as "TV GUIDE". Such information will become necessary, in practice, for 30 or 56 channel numbers, such as CATV stations in U.S.A., although there is no serious problem in Japan wherein there are not so many TV stations.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is an exemplary chart printed out in accordance with the process of FIG. 7.

DESCRIPTION OF THE PREFERRED EMBODIMENTS

The detailed description of the preferred embodiments according to the present invention will be now described with reference to the accompanying drawings.

Figure 1:
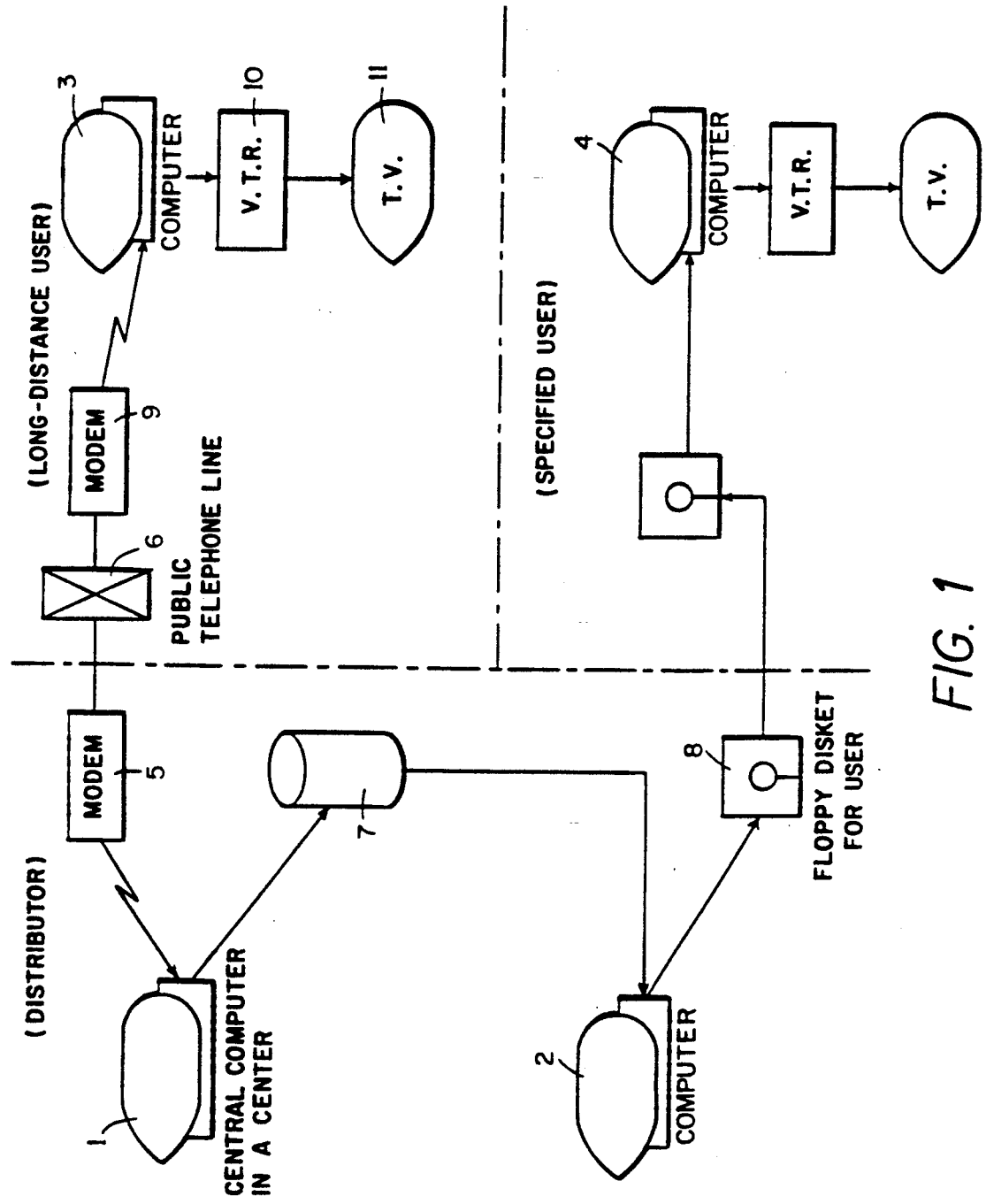
FIG. 1 is a block diagram of the preferred television program automatic control system.

An entire structure of this application is made of four groups as shown in FIG. 1.

1. Function of a central computer 1 in a service center
2. Function of an auxiliary computer 2 in a service center
3. Function of a computer 3 of a general user (hereinafter called a long-distance user) side
4. Function of a computer 4 of a specified user side A structure of each function of the four groups is described in FIG. 1 as follows.

The central computer in the service center is made of:

1. means for making an individual television program list in accordance with a questionnaire,
2. means for processing a claim (by a linear program),
3. means 5 for transmitting a television list to a public telephone line 6,
4. means for receiving a claim from the long-distance user through a public telephone line, and for storing it in a computer,
5. means 7 for transmitting data to the auxiliary computer in the service center in order to input the individual television program list for the specified user to the floppy diskette.

The auxiliary computer in the service center is made of:

1. means for receiving the individual television list for a specified user from the central computer in the service center and for inputting the received data to the floppy diskette 8 which is handed to the specified user.

The computer of the long-distance user side is made of:
1. means for receiving the individual television program list sent from the service center through the public telephone line,
2. means 9 for transmitting the claim to the individual television program list sent from the service center to the central computer in the center through a public telephone line,
3. means for controlling automatically the VTR 10 and the TV 11 in accordance with the individual television program list made in the service center and sent,
4. means for displaying and amending contents of the individual television program list made in the service center and sent,
5. means for displaying contents (a program guide) stored in a storage medium by a person who edits and issues all the television programs.

The computer of the specified user side is made of the same means as 3, 4, and 5 in the computer of the long-distance user side.

Figure 2:
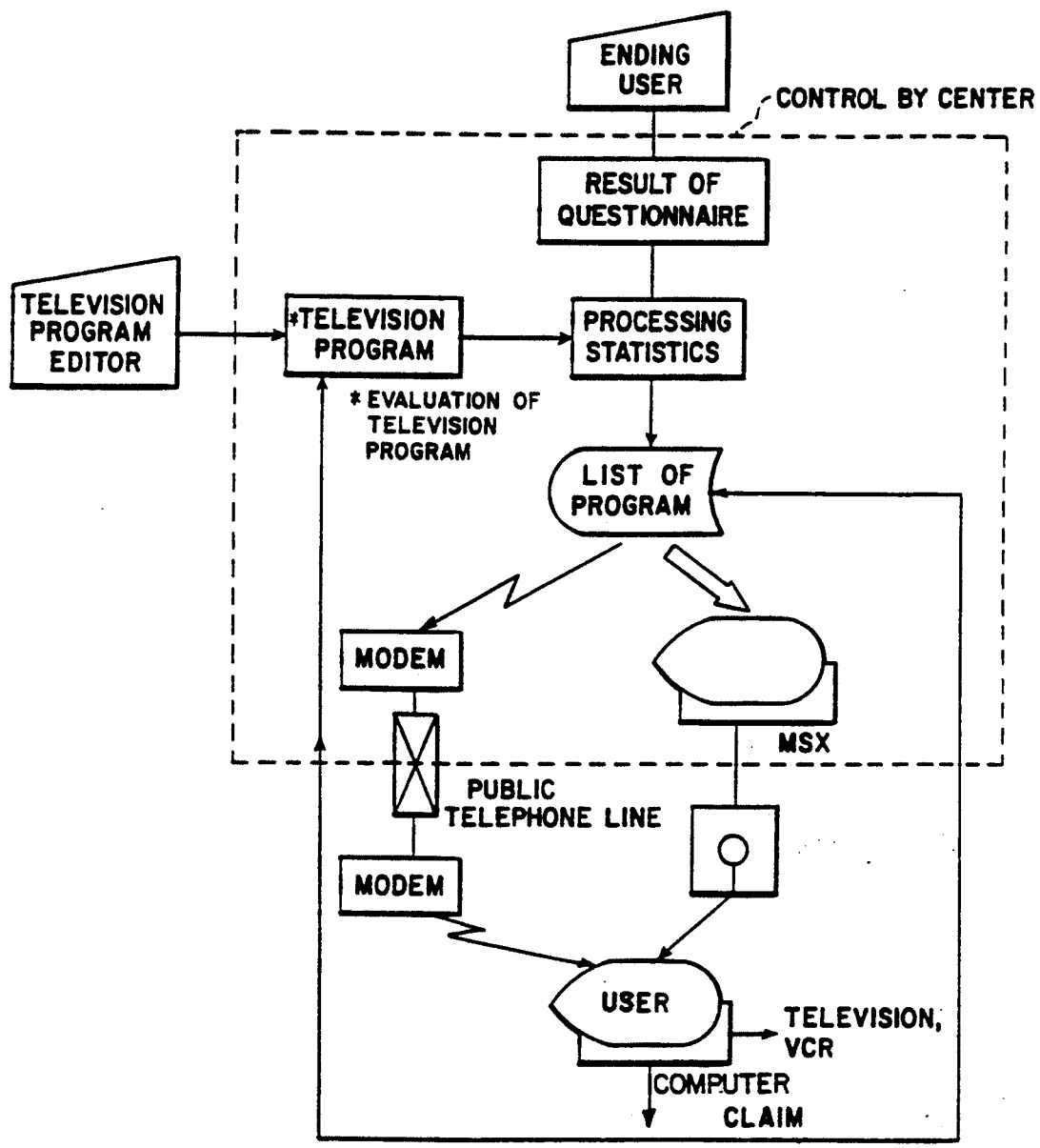
FIG. 2 is a bock diagram of a main portion for making a television program in FIG. 1.

The structure and operation of each means are shown briefly in FIG. 2. The structure and operation of each means will be described as follows 1. Function Of The Computer In The Service Center The function when it is expressed as a structural representation of the program is shown in FIG. 3.

(1) Means For Inputting a Result Of Questionnaire From Each Subscriber

Figures 3, 4:
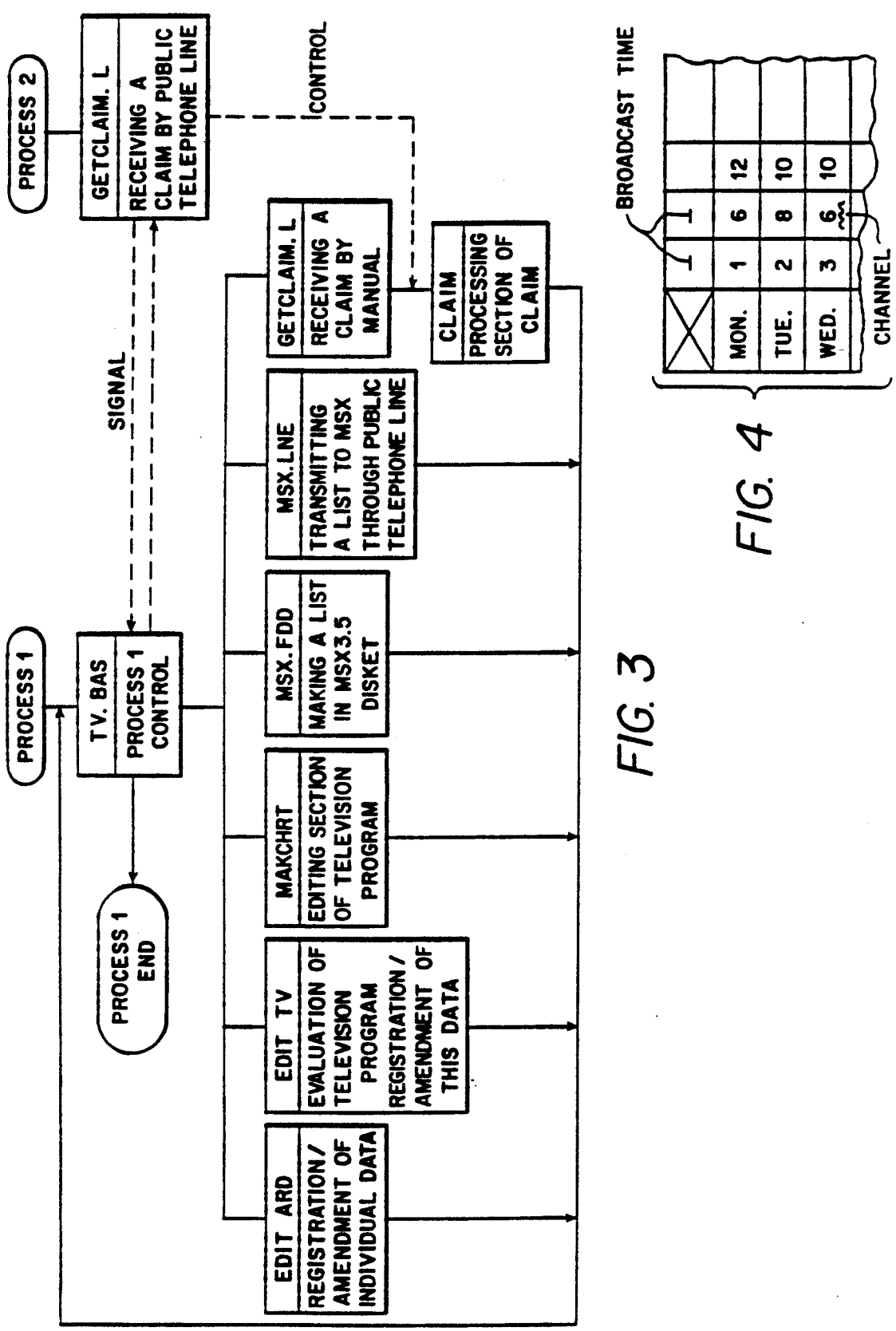
FIG. 3 is an explanatory view of a preferred program for a main central computer in accordance with the invention.
FIG. 4 is an explanatory view of preferred data processed in the program for making a television program.

FIG. 4 shows one of example of a paper for the questionnaire which is used as an input means therefore and which defines an individual taste. In FIG. 4, each day of the week is entered in the longitudinal section and a channel number of the television per broadcast time (each fifteen minutes) is entered in the horizontal section. This embodiment uses the following questionnaire, for example, as a fundamental questionnaire to make a paper that summarizes the questionnaire from each subscriber.

Q1. How many people do you have in your family?
- I am single.
- I am married but have no child.
- I am married and have an infancy.
- I am married and have a school child.
- I am married and have a junior high school child and older.

Q2. How old are you?
- I am under 25 years old.
- I am under 35 years old.
- I am under 45 years old.
- I am under 55 years old.
- I am over 56 years old.

Q3. Do you like watching the NHK program (state operated broadcasting)?
- I do not watch it at all.
- I sometimes watch a news program or the program in a morning in it.
- I Watch an educational program in it.

Q7. How often do you watch a documentary program?
- I always watch it.
- I often watch it.
- I sometimes watch it.
- I seldom watch it.
- I do not watch it at all.

Q8. How often do you watch a news program?
- I always watch it.
- I watch it at least once a day.
- If have any other favorite programs, I do not watch it.
- I seldom watch it.
- I do not watch it at all.

Q9. Do you like an entertainment program?
- I like it very much.
- I like it.
- I like it passably.
- I dislike it.
- I hate it.

Q10. Do you like a sports program?
- I like it very much.
- I like it.
- I like it passably.
- I dislike it.
- I hate it.

Q11. Do you like a general interest program?
- I like it very much.
- I like it.
- I like it passably.
- I dislike it.
- I hate it.

Q12. Do you like a quiz program?
- I like it very much.
- I like it.
- I like it passably.
- I dislike it.
- I hate it.

Q13. Do you like a variety show program?
- I like it very much.
- I like it.
- I like it passably.
- I dislike it.
- I hate it.

Q14. Do you like rock-and-roll and pop music in a music program?
- I like it very much.
- I like it.
- I like it passably.
- I dislike it.
- I hate it.

Q15. Do you like popular songs and folk songs in a music program?
- I like it very much.
- I like it.
- I like it passably.
- I dislike it.
- I hate it.

Q16. Do you like classical music in a music program?
- I like it very much.
- I like it.
- I like it passably.
- I dislike it.
- I hate it.

Q17. Do you like a historical drama?
- I like it very much.
- I like it.
- I like it passably.
- I dislike it.
- I hate it.

Q18. Do you like a home drama, or a comedy?

- I like it very much.
- I like it.
- I like it passably.
- I dislike it.
- I hate it.

Q19. Do you like a suspense drama or an action drama?
- I like it very much.
- I like it.
- I like it passably.
- I dislike it.
- I hate it.

Q20. Do you like a foreign movie?
- I like it very much.
- I like it.
- I like it passably.
- I dislike it.
- I hate it.

As above, five selective answers to twenty questions are set, and the amount of questionnaire items $20 \times 5 = 100$ is set. Twenty questionnaire items are about family, age, time field of not watching television, whether or not one likes the NHK program, what one's favorite drama is, whether or not one likes movies, news programs and what one is interested in, etc. An amount of items is twenty, and each item has five selective answers Accordingly a number is given to each item to practice linear processing as follows: $P(1)-p(5)$ are given to the item 1, $P(6)-P(10)$ are given to the item 2, $P(11)-P(15)$ are given to the item 3, and similarly, $p(96)-P(100)$ are given to item 20.

Figure 5:
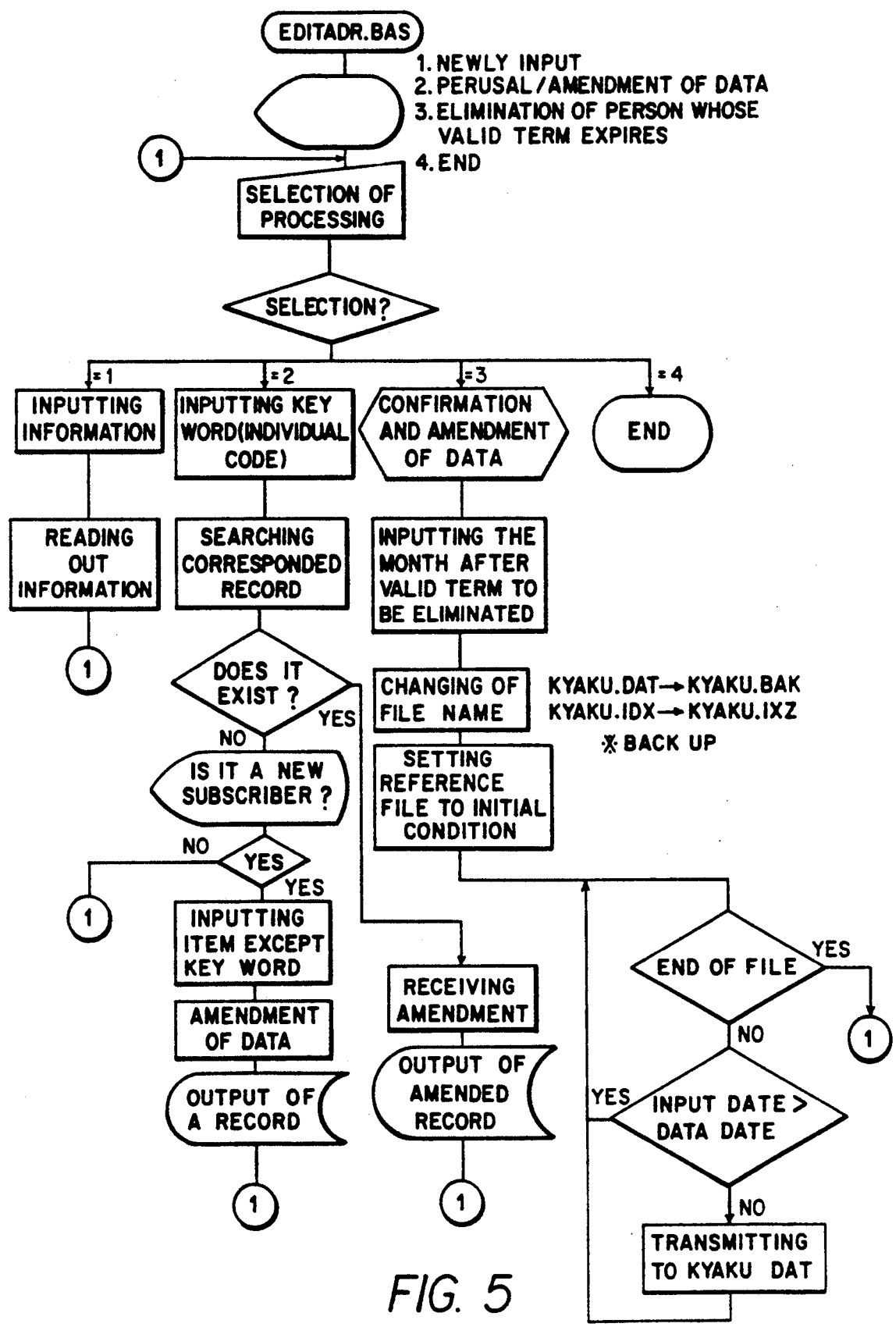
FIG. 5 is a flow chart for carrying out registration, inquiry (amendment) of subscriber's data.

The flow chart of a registration/reference (amendment) of each subscriber's data is shown in FIG. 5.

(2) Means For Evaluating Television Programs

Means for evaluating television programs will be described as follows: The similar form of paper of a questionnaire explained in (1) as means for evaluating television programs is used In this embodiment, for example, EVALUATION OF TELEVISION PROGRAM
(corresponding with the questionnaire)

E1. Generation for which this program is made
- infancy
- school children
- young men
- middle age
- old men E2. Political and economical factor
- strong
- medium
- weak
- little
- no E3. Scientific and informational factor
- strong
- medium
- weak
- little
- no E4. Historical and educational factor
- strong
- medium
- weak
- little
- no E5. Documentary factor
- strong
- medium
- weak
- little
- no E6. Factor of a news and a source
- strong
- medium
- Weak
- little
- no E7. Factor of entertainment
- strong
- medium
- weak
- little
- no E8. Factor of a sports program
- strong
- medium
- weak
- little
- no E9. Factor of a general interest program
- strong
- medium
- weak
- little
- no E10. Factor of a quiz program
- strong
- medium
- weak
- little
- no E11. Factor of a variety show program
- strong
- medium
- weak
- little
- no E12. Factor of rock-and-roll and pop music
- strong
- medium
- weak
- little
- no E13. Factor of popular song music
- strong
- medium
- weak
- little
- no E14. Factor of classical music
- strong
- medium
- weak
- little
- no E15. Factor of a historical drama
- strong
- medium
- weak
- little
- no E16. Factor of home drama and comedy
- strong
- medium
- weak

- little
- no

Figure 6:
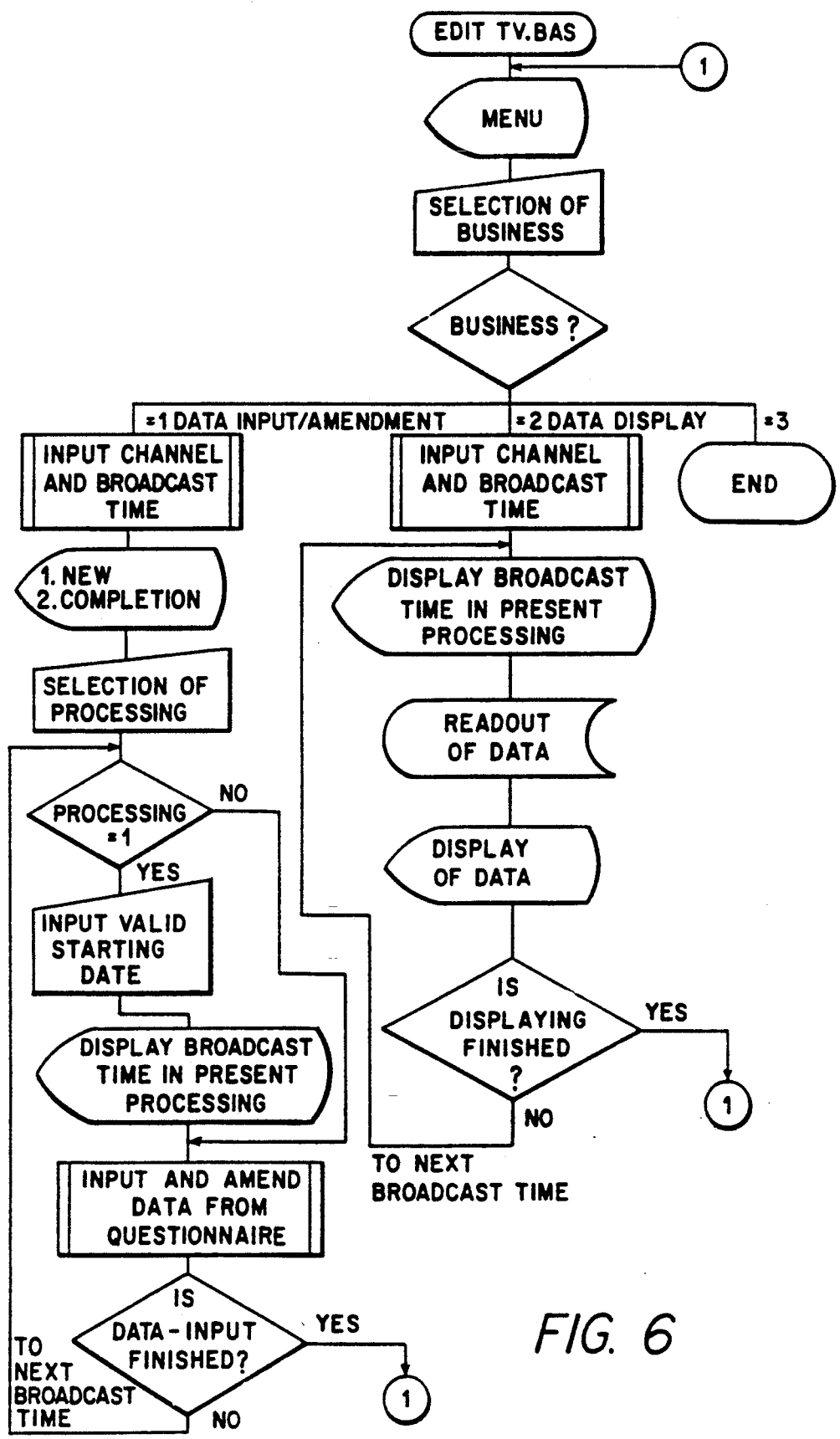
FIG. 6 is a flow chart which is continued from FIG. 5.

E17. Factor of suspense drama and action drama
- strong
- medium
- weak
- little
- no E18. Factor of a foreign movie
- strong
- medium
- weak
- little
- no The above factors are linked with the contents of the questionnaire to the subscriber. The data registration of the television program are shown by the flow chart in FIG. 6.

(3Means For Processing By Linear Program Method

A fundamental logic to practice linear programming on the evaluation described in (1) and (2) will be explained. The system presupposes the following expression 1, namely, $$pl(i) = \sum_{j=1}^{n} Pc(j) \cdot p(j) \cdot T(i,j) \qquad 1$$

Where:

$pl(i)$ means a degree of concern to program i expected by a subscriber (it is expressed by a number of points, wherein Point 0 means that a subscriber is not interested in the program i at all).

i Means program i when twenty one hours from 5 AM to 2 AM is cut by every fifteen minutes.

$P(j)$ means whether item j in the questionnaire is checked or not. For example, if 3 of the question No. 3 is checked, it is expressed as follows.
$p(11) = p(12) = p(14) = p(15) = 0$
$p(13) = 1$ N means 20 questions × 5 selective answers = 100

$T(i.j)$ means whether the evaluation of item j is checked in the television program i. It takes the value of 1 or 0.

$Pc(j)$ is an unknown coefficient which takes a value of $0 \leq Pc(j)$. (It does not rely on a subscriber.)

The expression 1 is to evaluate how much common interest there is between human beings and the television program. The coefficient $Pc(j)$ is decided commonly on all the human beings. In the value of $Pc(j)$, feedback is practiced by an accumulation of a claim from the subscribers as will be explained later, and as a result, the value of $Pc(j)$ is decided more correctly.

In the above linear processing (programming), the expression 1 is expressed as a primary expression to evaluate common interest between human beings and the television program. The coefficient $Pc(j)$ is decided as the common value between human beings, and also, the value of $Pc(j)$ is calculated more correctly doing a feed back (study) by an accumulation of a claim from the subscribers The detailed explanation will be described later.

(4) Means For Storing And Printing Out The Data

Figure 7:
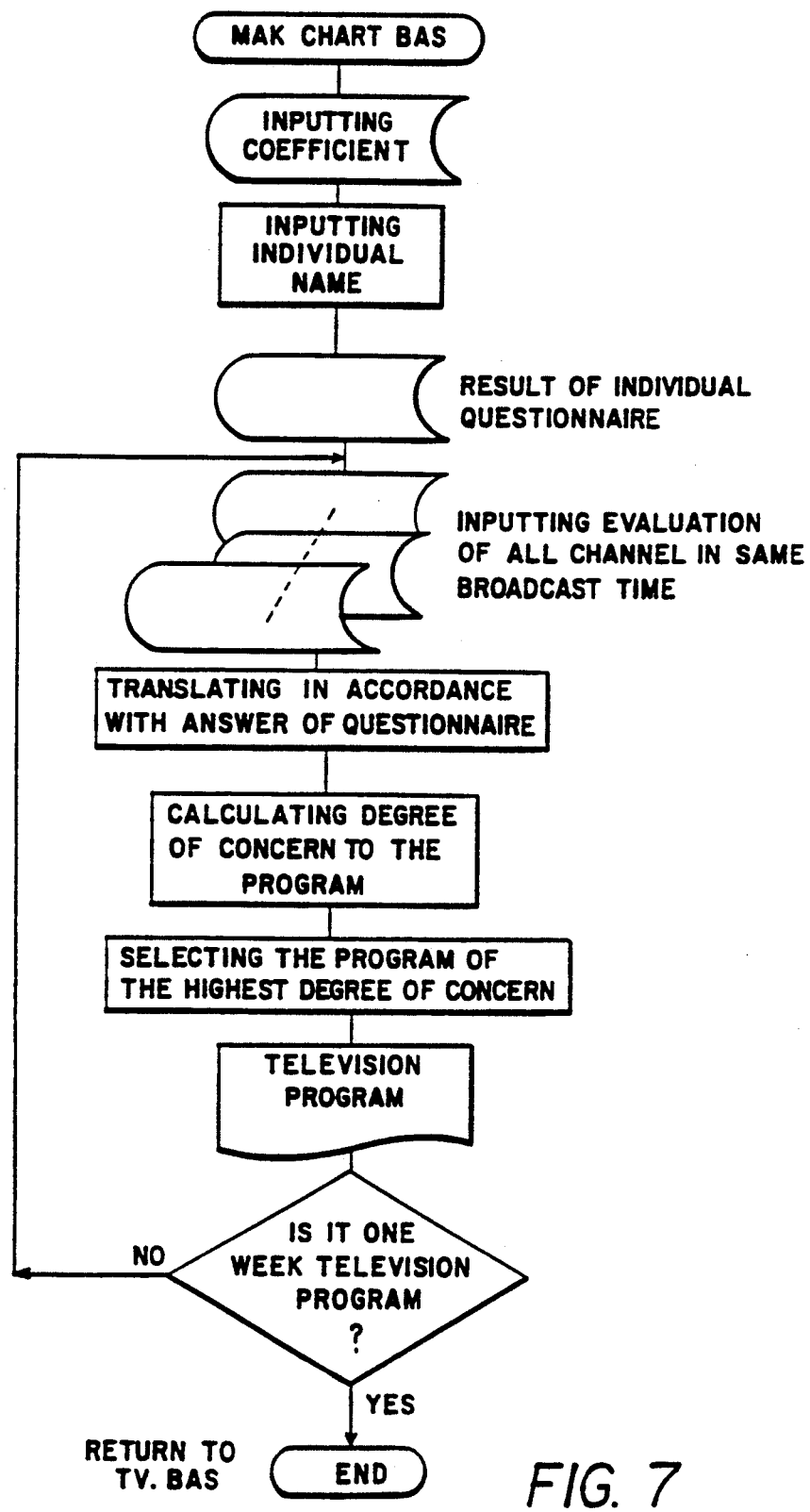
FIG. 7 is a flow chart of a process of printing out from a hard disk as a television program data storage means.
Figure 8:
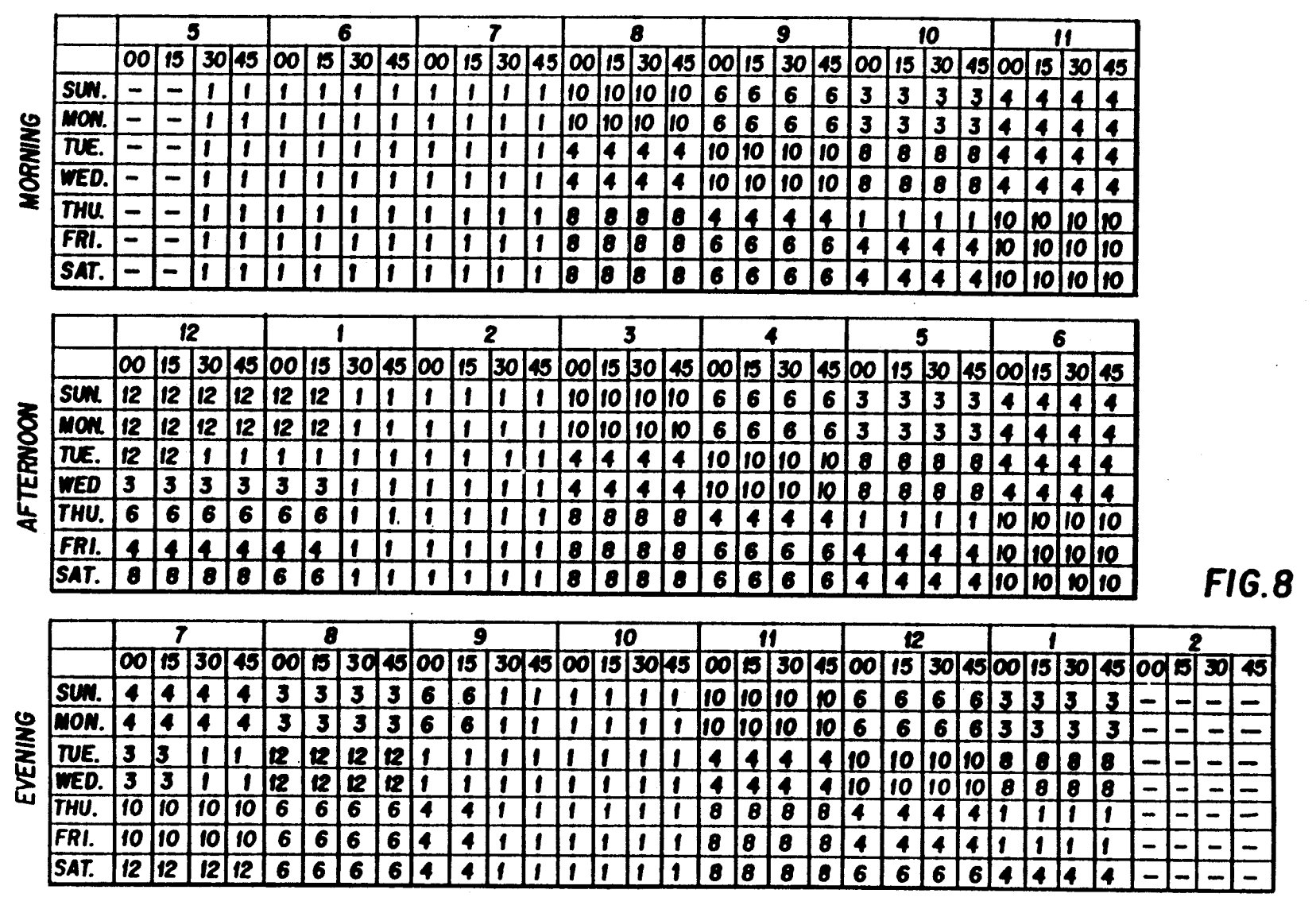

In this invention, a hard disk means for storing data is used. The flow chart of processing of the data input of the hard disk is printed out by a printer is shown in FIG. 7. Accordingly, supposing that data of many people Can be stored individually in the hard disk, and that an individual code number has been decided previously, a television program which well fits each subscriber is printed out. An example print-out is shown in FIG. 8. The print-out means confirmation of this process rather than the television program is reported finally to the client. Namely, what is printed out is tested for confirmation. The step for making a more perfect television program is shifted by collecting a claim appearing in the test and practiced by the collected feedback of claims.

(5) Processing Of Claims

The value of $Pc(j)$ is obtained correctly by an accumulation of claims from the subscribers, as the above explanation in the last part of the fundamental logic of data processing. The example of receiving claims can be shown as follows. As an example of claims, the following result of calculation is obtained for one subscriber.

pl (Tuesday/19:30) TBS = 4.9 (points of interest)

pl (Tuesday/19:30) NHK = 4.8 (points of interest)

Accordingly, this invention suggests TBS at 19:30 on Tuesday to the subscriber. But a claim appears on the result of the above calculation. Namely it changes to $pl(i1) < pl(i2)$, because $pl(i1) \geq pl(i2)$ does not fit the subscriber. Reference symbol $Yi$ expresses how much $pl(i2)$ is bigger than $pl(i1)$ as points of interest. In other words, it relates to how much points of fact of claiming is evaluated (in the present time, it is evaluated to $Yi=1$). Accordingly, $pl(i2) - \{pl(i1) + Yi\} \leq 0$ This expression is arranged by the expression 1, as a result, $$\sum_{j=1}^{n} Pc(j) \cdot p(j) \cdot \{T(i1,j) - T(i2,j)\} - Yi \leq 0$$

and supposing as follows, $$p(j) \cdot \{T(i1,j) - T(i2,j)\} = Aij \quad Pc(j) = Xj$$

The expression $$\sum_{j=1}^{n}$$

$Aij.Xj - Yi \leq 0$ is shown. Also on assumption that right side is $Vi$, the expression $$Vi = \sum_{j=1}^{n}$$

$Aij \times Xi - Yi$ is shown. In this expression, $Xi$ must be decided so that the value of $Vi$ becomes a smaller value. The sum V of only $Vi$ (the television program with which dissatisfaction appears) which takes positive values to evaluate the above is considered. It results in $$V = \sum_{k}^{m} Vi(Vi > 0),$$

wherein m is the total of an element of $Vi$ which is $V > 0$. Namely, the correct $Xi$ can be changed by decreasing the value of V in accordance with receiving many claims from the subscribers.

Figure 9:
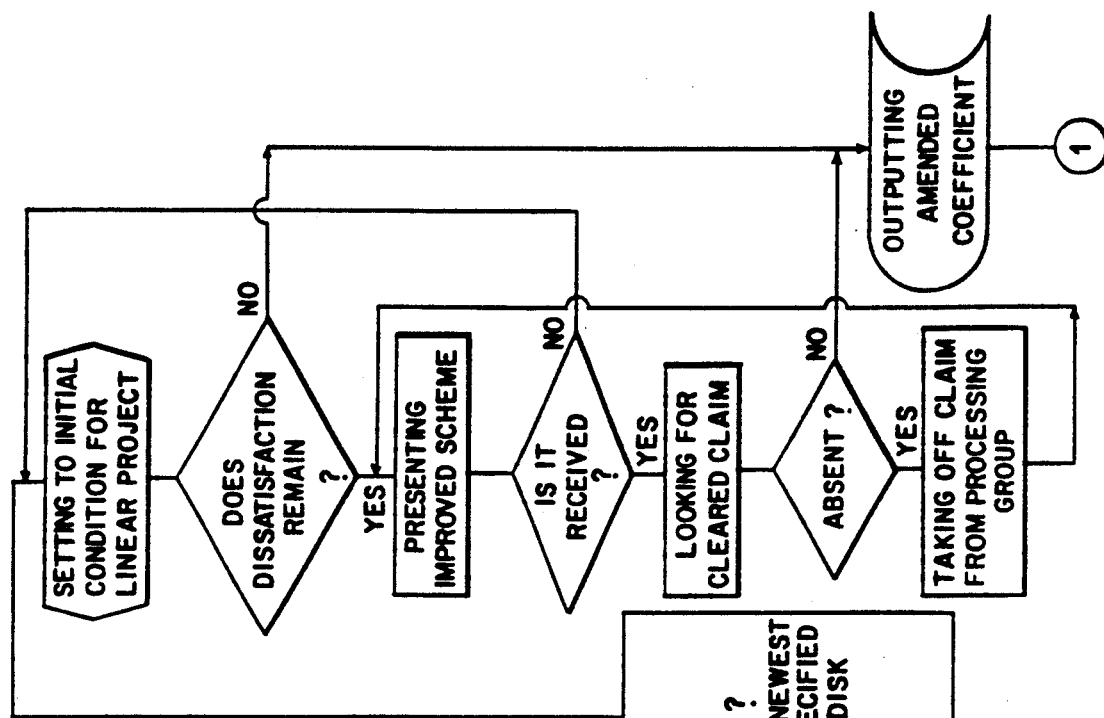
FIG. 9 is a flow chart of a step corresponding with processing of a "claim" subroutine.
Figure 9:
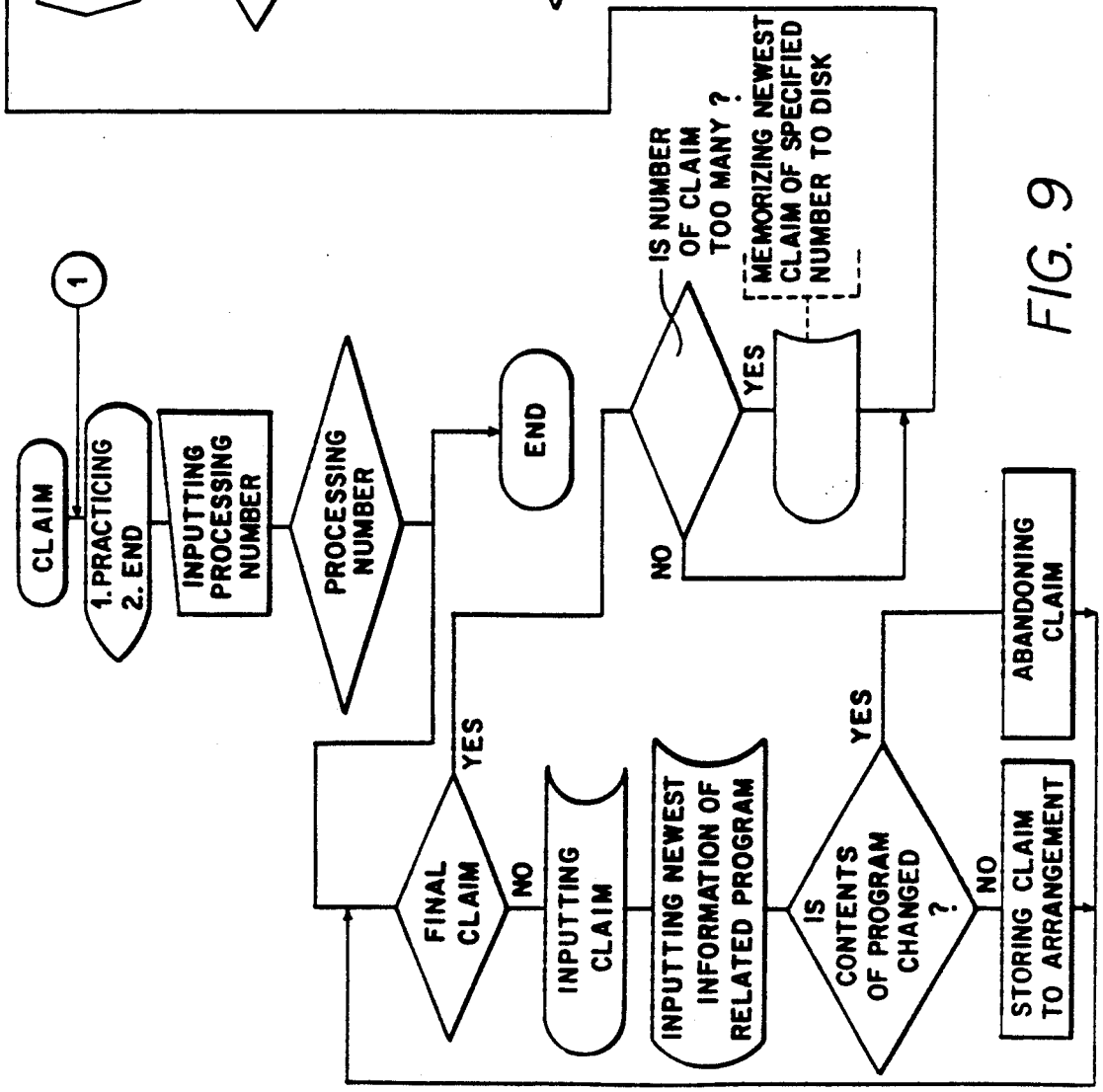

The flow chart of the step corresponding to processing of claims is shown in FIG. 9. As shown, in the processing of claims, a series of steps from "setting to the initial condition for linear project" to "looking for improving scheme" is most important. Namely, setting to the initial condition means recalculation of the Pc(j), and improving scheme means changing to the value calculated after the different value is calculated. This step involves mathematical processing, and is the most important step of processing claims, namely, a studying function. The Pc(j) is improved by this step, and as a result, the precision of this system is improved. It is thus possible to present a more fitting television program to the client.

(6) Means For Giving The Data For An Individual Television Program List To The User The data for the individual television program list calculated and made by the central computer in the service center in accordance with contents of questionnaire corresponding with an individual interest is input to the user's computer in two ways. In both, the data for the individual television program list are finally stored in the memory device (floppy diskette) kept by the user, and control automatically the VCR and the TV.

There are two ways of inputting the data in the floppy diskette which fits the computer kept by the user. The two ways will be described as follows. When the central computer in the service center is connected to the computer of the user, any kind of computer can be used in this way. The data are stored in the user's floppy diskette through the modem and in accordance with the function of computer kept by the individual.

Figure 10:
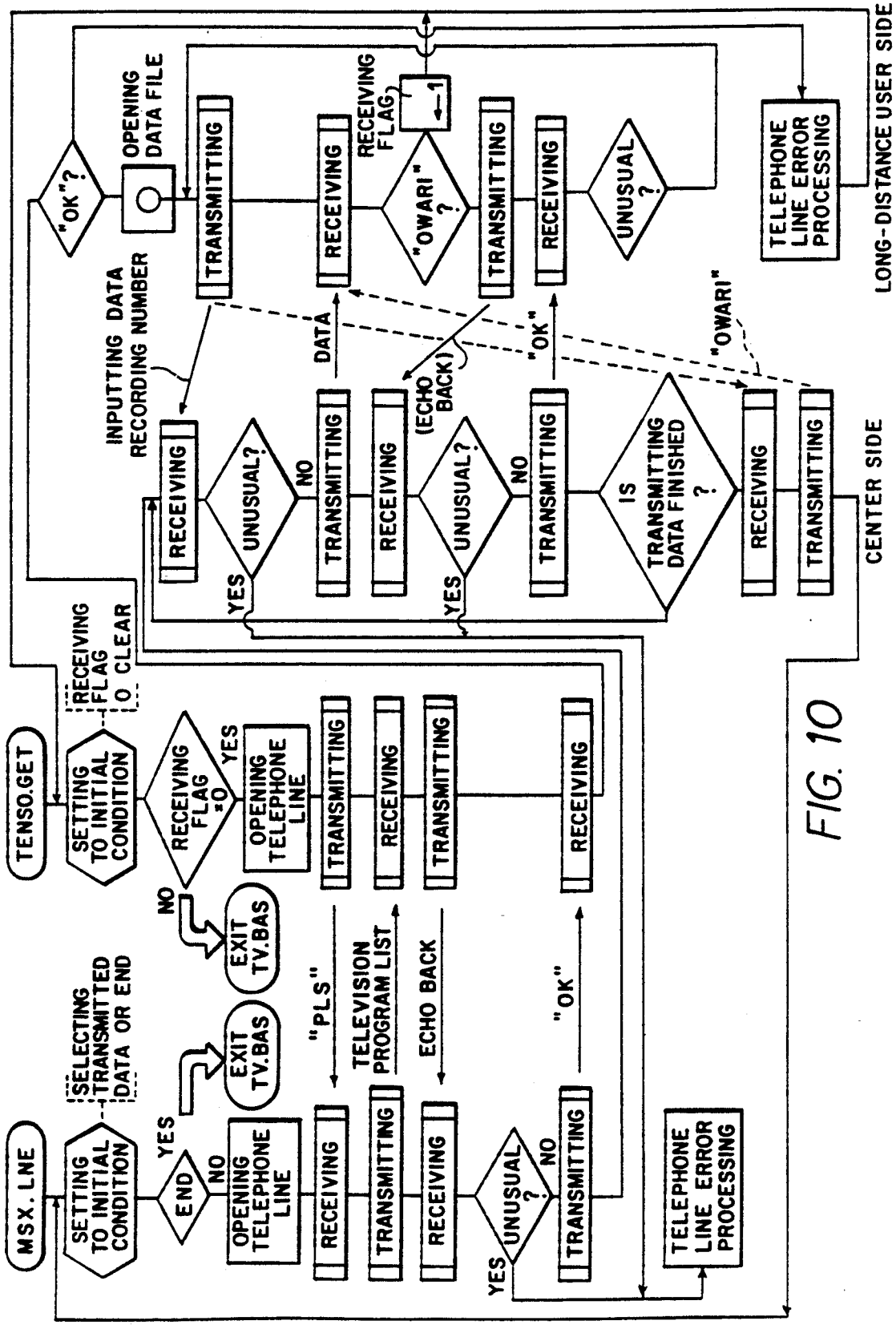
FIG. 10 is a flow chart of a program which controls transmitting by a public telephone line of a television program list.

The flow chart of this operation is shown in FIG. 10. This process is carried out by the program on the left side of FIG. which controls an operation of the central computer in the service center, and the program on the right side of the figure which controls the computer kept by the long-distance user. An arrow which connects the flow charts of two programs means communication data between two computers through a public telephone line. Data transmission is started by executing the program "TENSO.GET" by the user at the time which has been decided previously by telephone communication to the long-distance user from the center. This practice is done by pushing the one-touch function key.

The service center side calls out the central computer, and at this time, the user side computer outputs three letters "PLS" which means finishing of preparation to the central computer. The communication between the central computer in the service center and the long distance user uses an echo back method to recover data in the event of signal degradation by noise on the telephone line. In the echo-back method, a receiving side always transmits data received to the transmitting side, and as a result, the transmitting side can check the transmitted data. If the data is different from the data transmitted by the transmitting side, the transmitting side transmits the same data again to the receiving side. In the echo-back method, the time for transmitting becomes longer but any problem on the data by noises etc. can be avoided.

Finishing of data processing after transmitting and receiving the data is judged by receiving the code "OK" and the operation continues. Finishing of data transmission to the long-distance user's computer from the central computer is judged by sending the five letters "OWARI". Namely, transmitting procedure is controlled by an application program level.

Another method for making the floppy diskette in which the data for individual television program list is stored will be described as follows. The floppy diskette is decided in accordance with various hardware conditions kept by the specified user and also the floppy diskette is made on the auxiliary computer in correspondence with the kind of computer which has been used. For example, the method for making the data to the specified user which has 3.5 inch floppy disk drive of MSX 2 will be described as follows.

Figure 11:
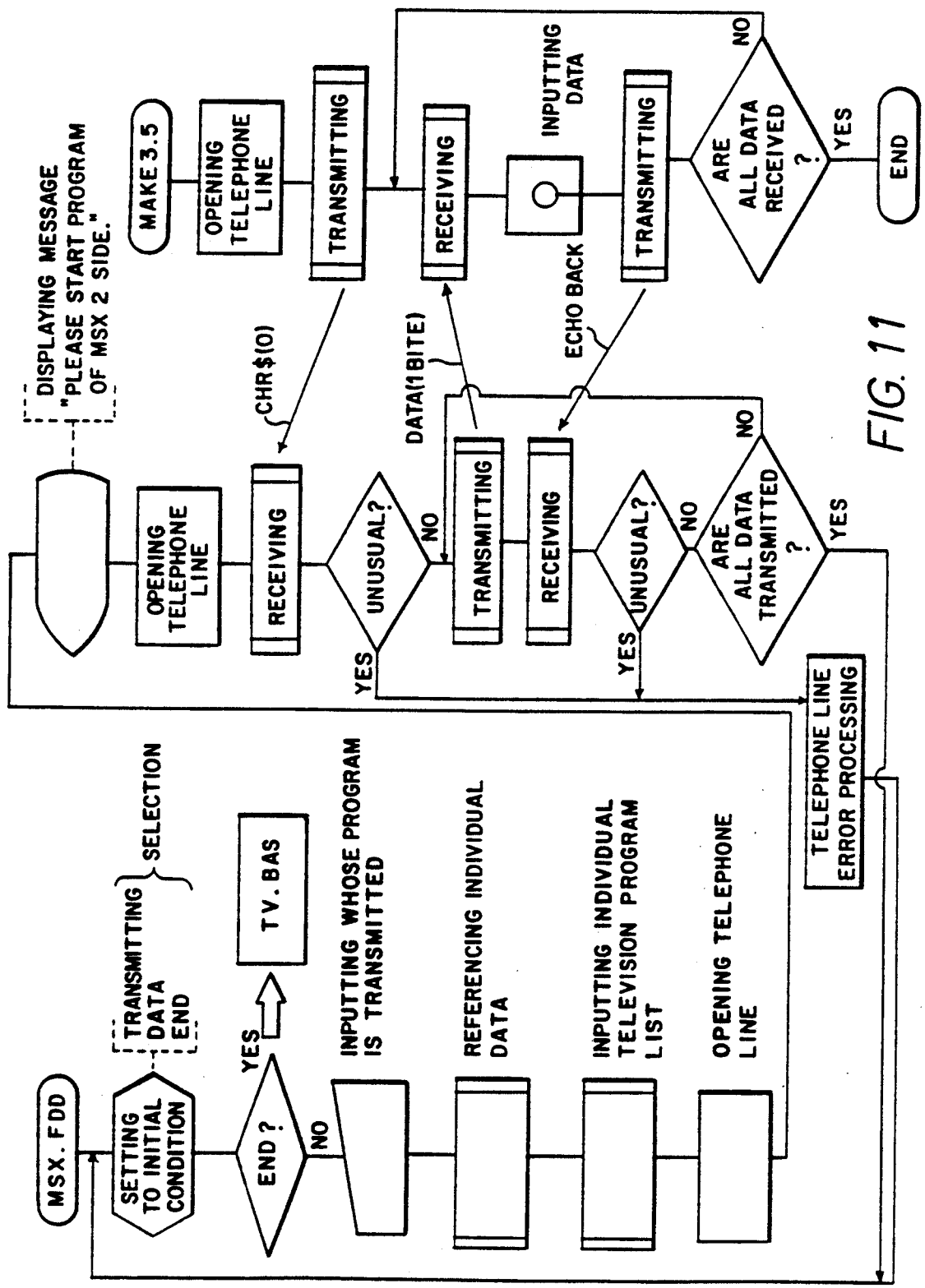
FIG. 11 is a flow chart of an auxiliary central computer (MSX).

The flow chart of the program is shown in FIG. 11. This operation is made as the data transmitting program by an on-line transmission between the central computer in the service center and the auxiliary computer (MSX 2). Finishing of preparation of the auxiliary computer side is informed to the central computer by sending a null code 0. This way also uses the echo-method to avoid problems created by noise etc. on the telephone line in the same manner as the long-distance user's case. The floppy diskette of data for the individual television program list for the auxiliary computer made by this process is delivered to the subscriber.

(7) Receiving Claims

The means for inputting claims from the user will be described as follows There are two methods for receiving claims from the user. First, the long-distance user inputs claims to the individual television program list Namely, in this method, the claim is transmitted lo the computer in the service center through a public telephone line by operating the personal computer. Second, the specified subscriber inputs directly claims delivered to the service center to the central computer by manual operation by the operator.

Figure 12:
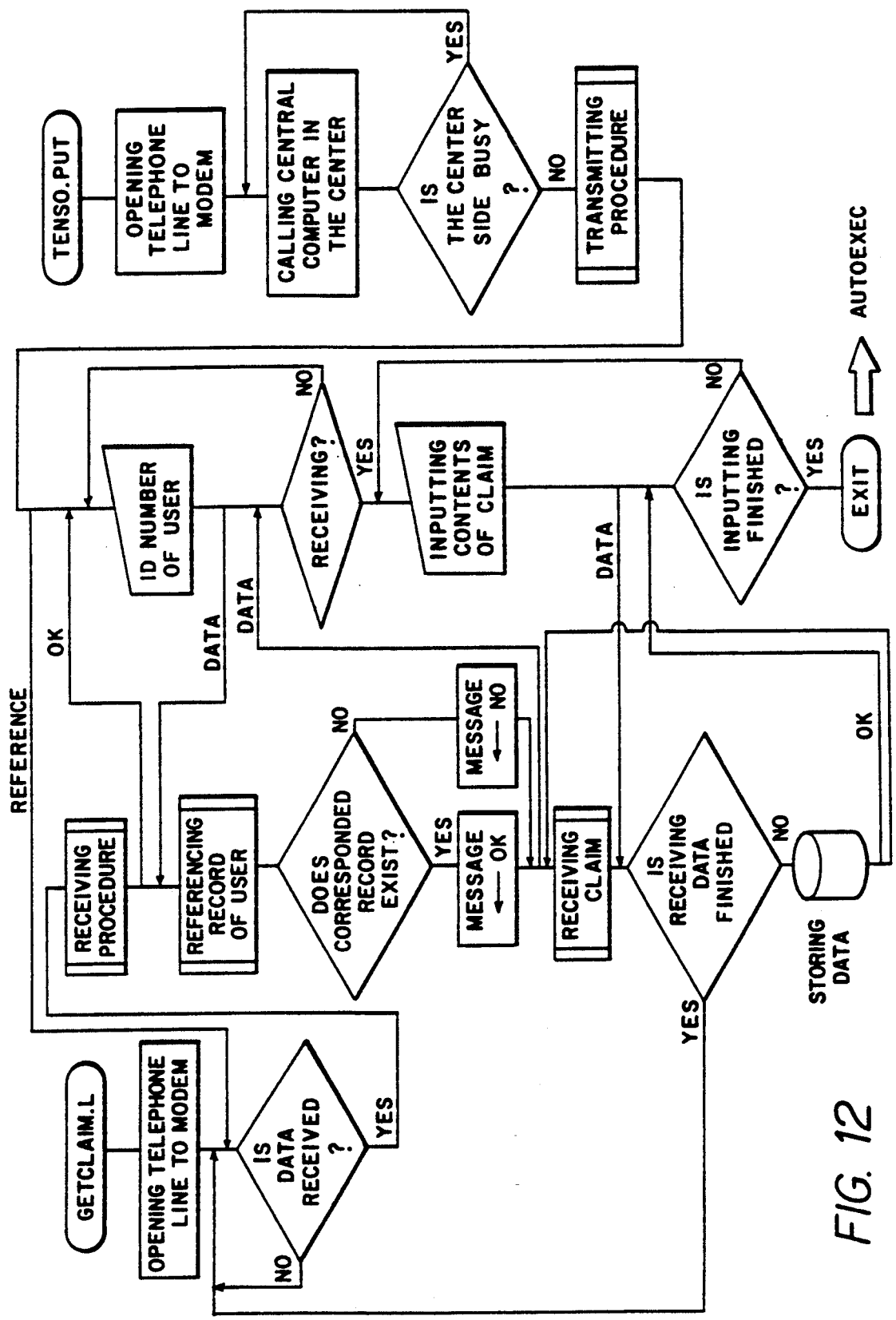
FIG. 12 is a flow chart of a program for receiving a claim of a central computer, when a long-distance user sends a claim to the computer center through a public telephone line.
Figure 13:
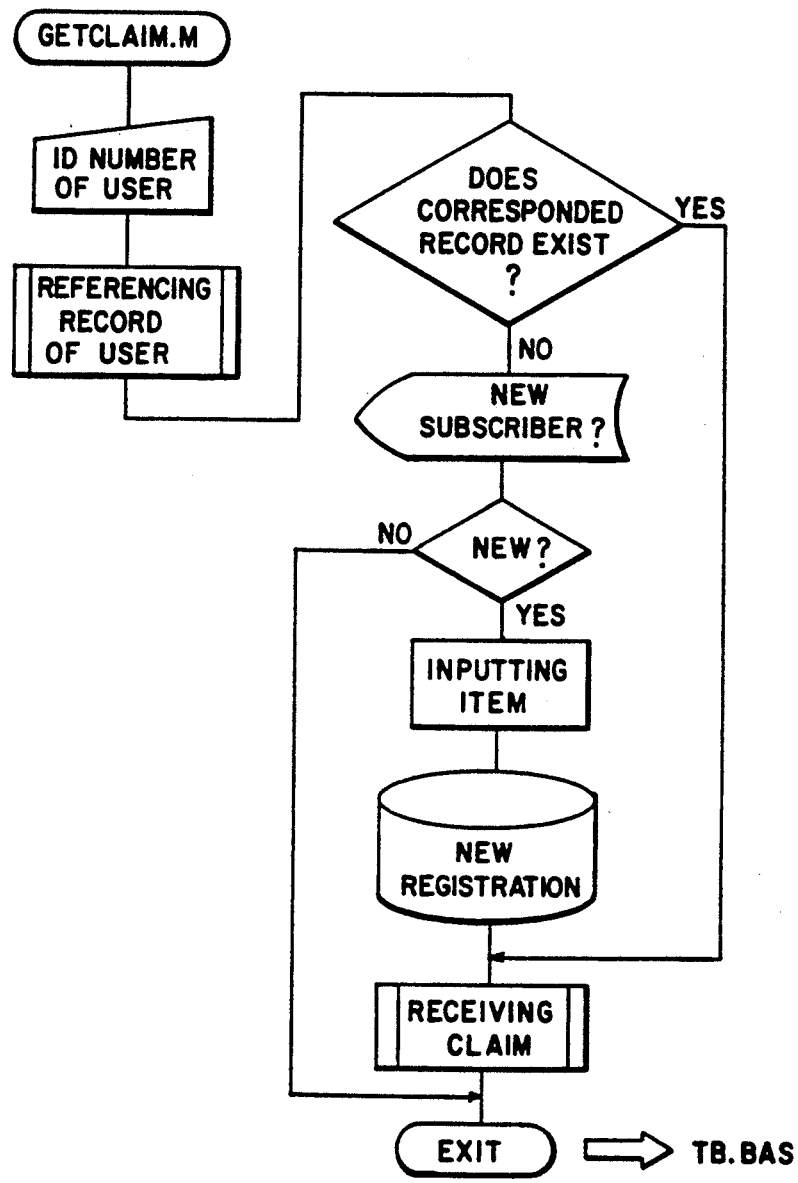
FIG. 13 is a flow chart of a program for inputting a claim which is forwarded to a computer center through means other than a public telephone line.

The flow chart of the program with which the long-distance user outputs claims to the individual television program list is shown in FIG. 12. This flow chart has two programs to communicate the data between two CPU through a public telephone line. In FIG. 12, the left side is the flow chart of the program of the central computer in the service center side, and the right side is the flow chart of program in the long-distance user side. The line which connects two flow chart sindicate transmission/reception of the signal through a public telephone line. "Referring to record" in FIG. 12 means that the long-distance user refers to the data record which mentions the contents registered in the central computer in the service center. When the user is registered, it is supposed that an ID number has been given to the user previously. FIG. 13 is a flow chart of the program to input directly the claim delivered by the other method to the service center in the central computer by the specified user (who does not use a public telephone line).

2. The Function Of The Computer Of The User Side

Figure 14:
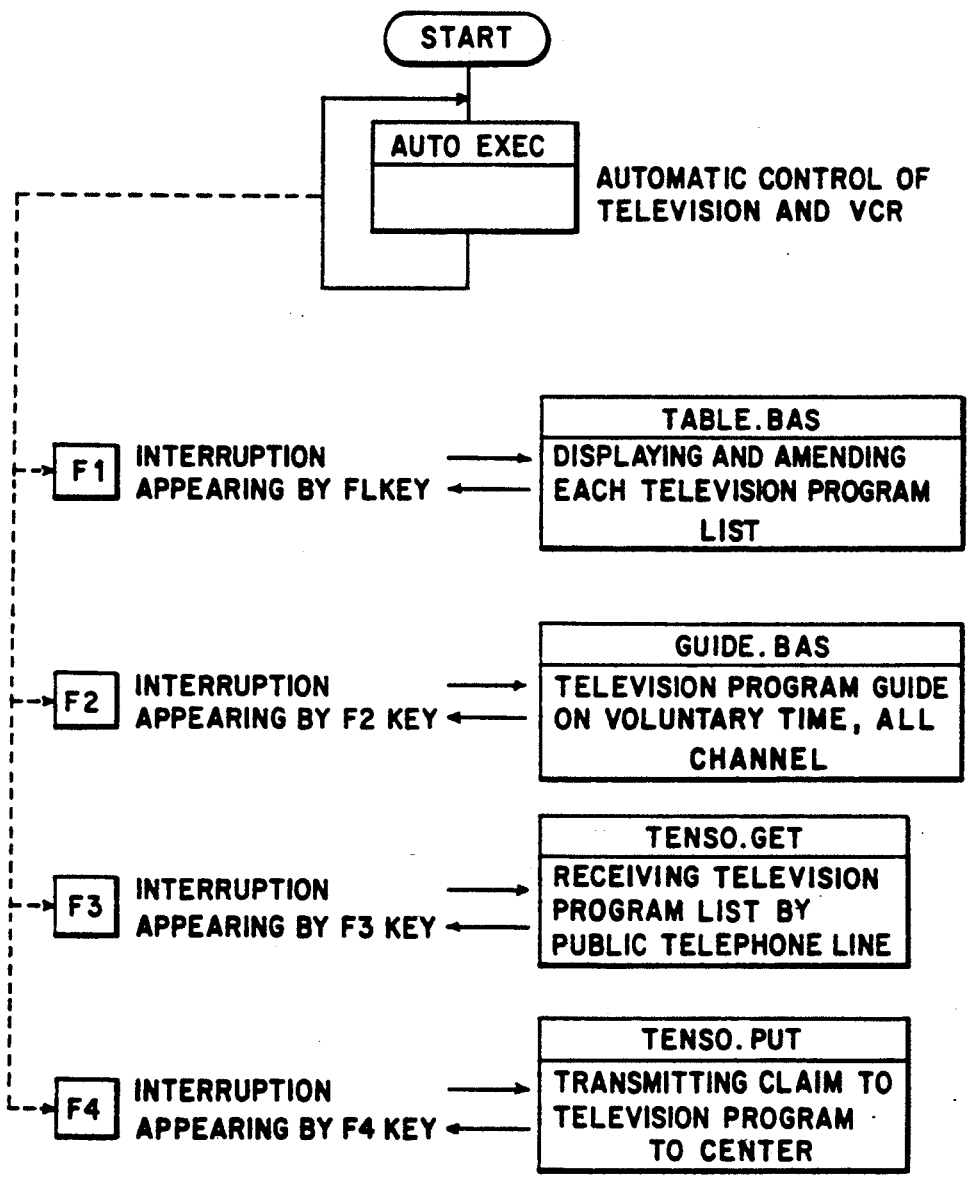
FIG. 14 is an explanatory view of a program for the computer of a long-distance user.

An explanation of the program for the user's computer is given in FIG. 14. The program of the specified user which is not connected to the central computer in the service center through a public telephone line is also same except "TENSO.GET" and "TENSO.PUT" in FIG. 14. The computer of the user side controls the TV, or the VCR in accordance with the individual television program list delivered and usually calculated by the central computer in the service center, as shown in FIG. 14. The user creates an interrupt by pushing the function key (the long-distance user will push the F1–F4 key, the specified user will push the F1 or F2 key) of the computer kept by the user in accordance with the object, and the program having the function of the object is practiced by one-touch.

Next, each function will be described; however means for receiving the individual television program list through a public telephone line, and means for transmitting the claims to the service center, are omitted to avoid repetition

(1) Means For Controlling The TV And The VCR

Figure 15:
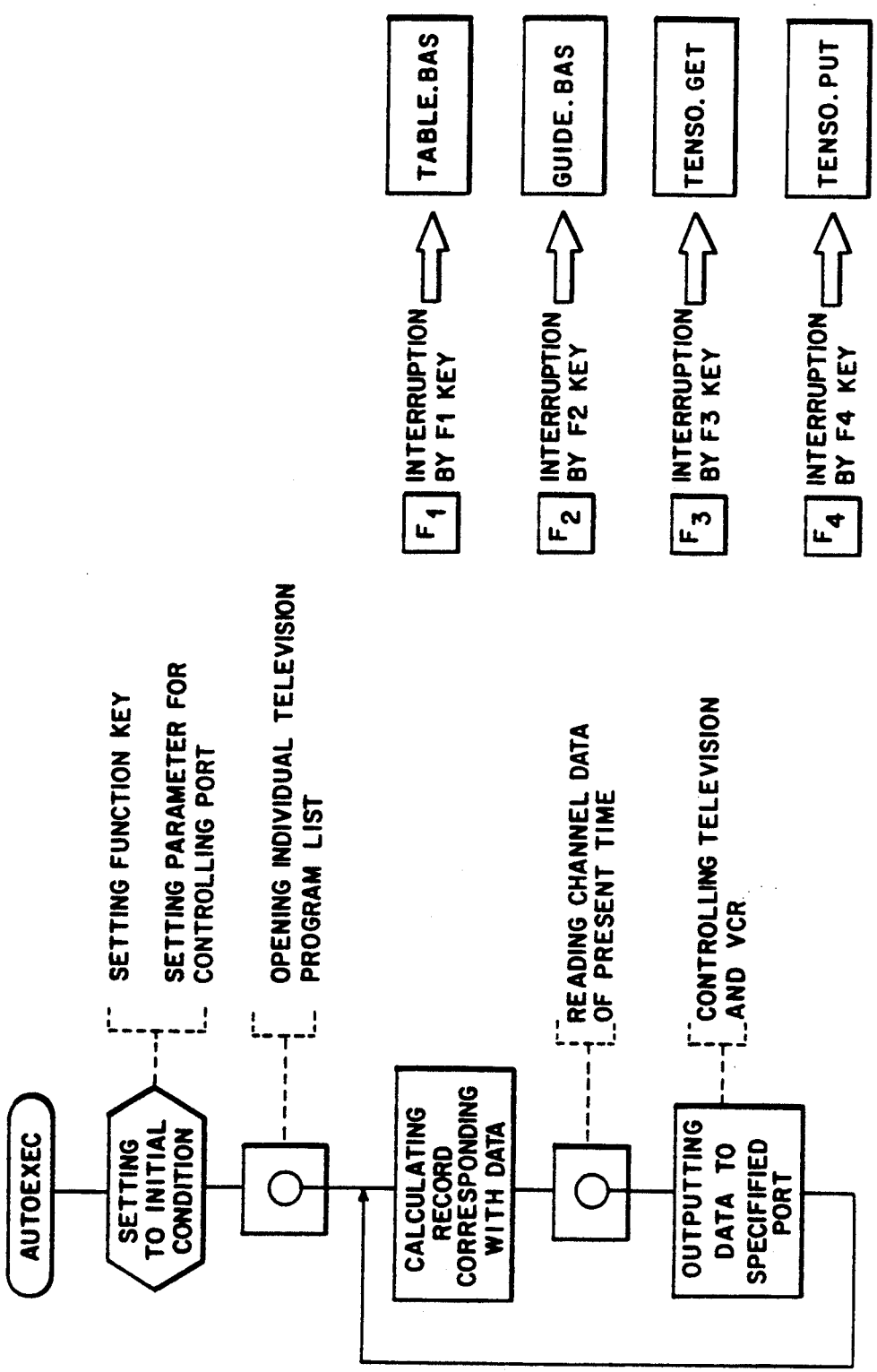
FIG. 15 is a flow chart of a program for controlling a TV and a VCR.

The flowchart of the program for controlling the computer of the user is shown in FIG. 15. This program is executed by the central computer in the service center, and takes out the data for individual television program list input in the floppy diskette used in the user's computer, in correspondence with days of a week, time, and transmits the data for individual television program list to the port connected to the control device (this applicant has already filed an application on this control device) of the TV and the VCR. The method for calling other functions by the user adapts the method that the interruption is made by the function key.

(2) Means For Referring To And Amending An Individual Television Program List This means indicates the function for referring to the contents of the individual television program list made for the user and for amending a part of the contents thereof in correspondence with the user's necessity during controlling the TV or the VCR by the computer kept by the user. This function is practiced by pushing the function key of No. 1 in the computer kept by the user during controlling of the TV or the VCR.

Figure 16:
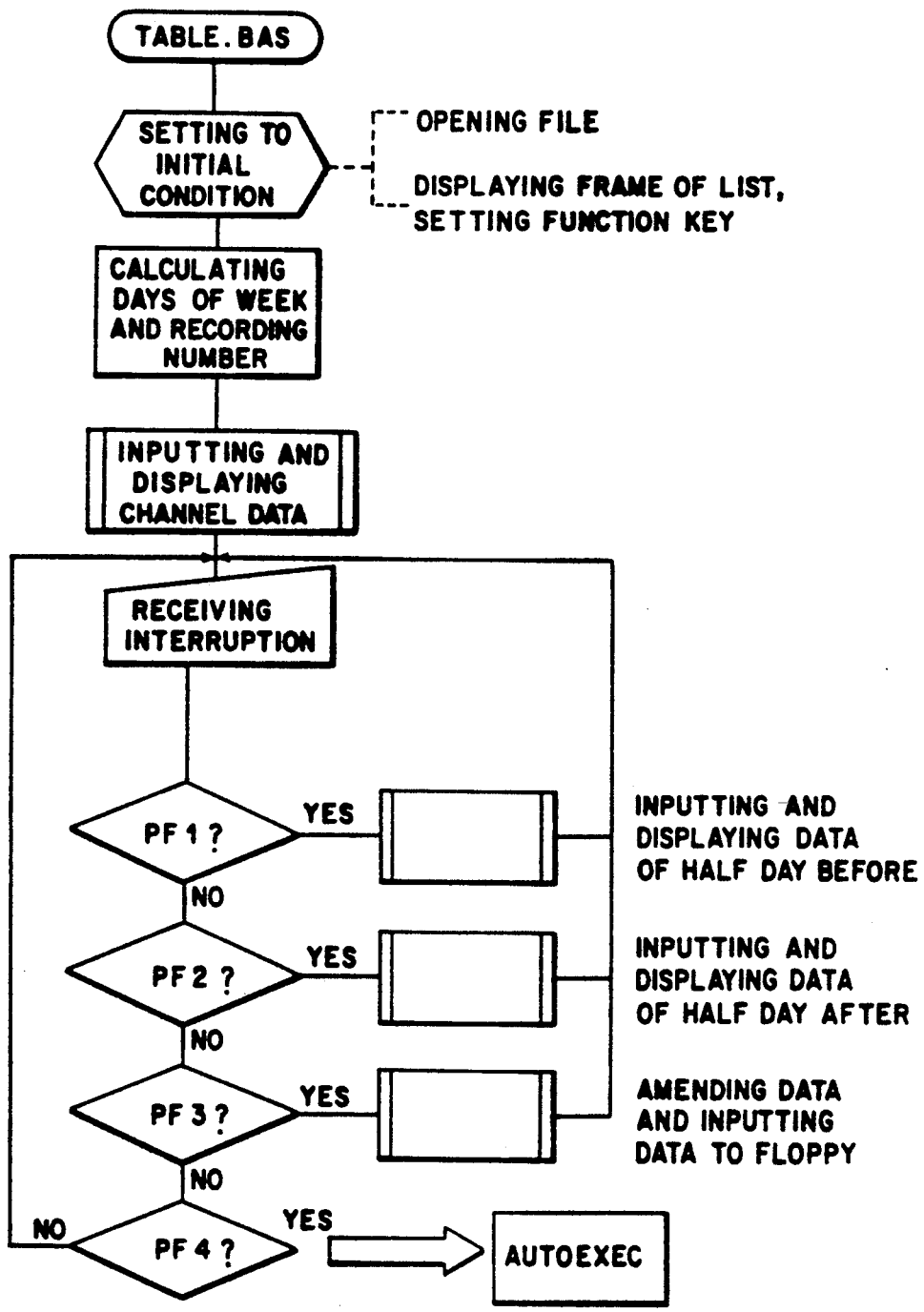
FIG. 16 is a flow chart of a program for amending an individual television program list of a TV and VCR.

The flowchart of the program of the function is shown in FIG. 16. When the program is called, the program knows the present time and displays the individual television program list of a half day with the present time on the display (TV screen). All the individual television program list can be called out on the display, and all the individual television program lists show a half day (from 0 AM to 12 AM, from 12 AM to 24 PM). If the user wants to amend a part of the individual television program list, the program is shifted to the operation for receiving am amendment by pushing No. 3 of the function key. The indication of the method for amendment is displayed on the television display. The amended data is stored in the floppy diskette each time, and the control of the TV and the VCR thereafter is practiced in accordance with the amended individual television program list.

Figure 17:
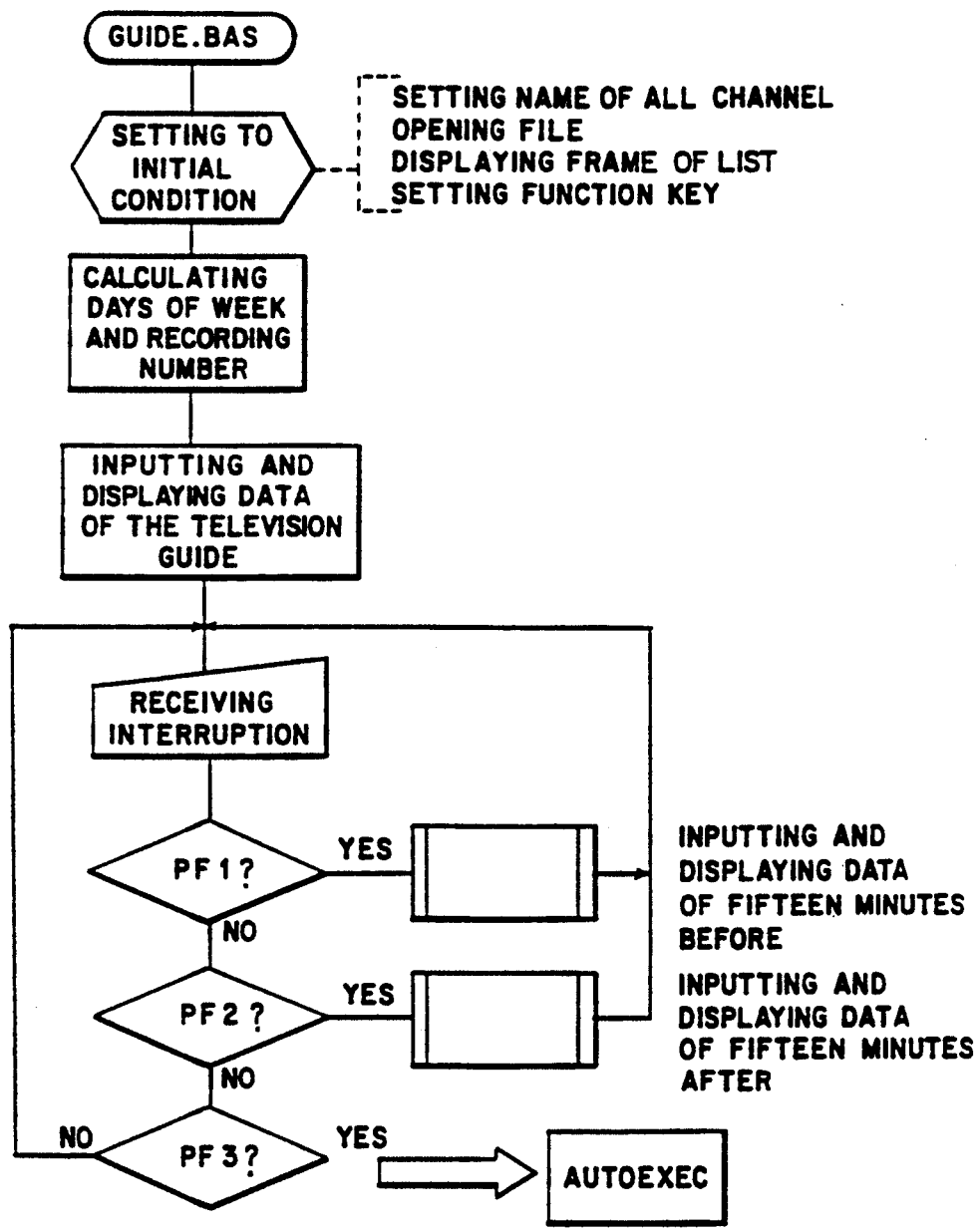
FIG. 17 is a flow chart of programming when a floppy diskette is used.

4. Means for Guiding The Television Program On All Channels At a Voluntary Time This function displays the program guide of each television station telecasted at the voluntary time on the display. The contents of the guide presupposes to store the above in the memory medium by the person who edits and issues all the television programs. The various media of magnetic, optical, etc. including various floppy diskettes can be used as the memory medium. For example, the flowchart of the program using the floppy diskette is shown in FIG. 17. This function is practiced by pushing No. 2 of the function key of the user's computer during controlling the TV or the VCR.

When the program is called out, this program knows the present time by a clock in the computer. 24 hours of one day is divided to fifteen minute intervals, and the data record which describes the contents of the television program from the point including the present time is referred to. The data record presupposes that the television program guide of all the television stations during broadcasting is input, and the computer reads out the data record and displays it on the display. The data of each fifteen minute interval before and after the present time can be referred to in order.

As the above explanation, comparing this invention with conventional approaches, when the individual television program list is made and the claim about evaluation of the program is stated by the user side, it is possible to amend by communication of the information which is sent and is received by the user side through the telephone to the center each time, and it is possible to be controlled and to amend TV or VCR programming temporarily without amending the original data. In order to hear in a restricted time after the user comes back home the programs recorded during the user's absence, the user can make a priority order to the programs, and it is possible to play back, preferentially, important programs for the user. When the user uses the channel designated in the individual television program list at home, for example, when the channel is a sports program, it is possible to designate sports programs, for example swimming, which is liked by the user by displaying as a scroll all sports programs telecasted at the same time, together, to confirm which sports the user likes. The above functions have many superior merits compared with the conventional system the practical effect is increased.

Although certain preferred embodiments have been shown and described, it should be understood that many changes and modifications may be made therein without departing from the scope of the invention.

I claim:

1. Apparatus for providing an individual television program list wherein television channels and corresponding time intervals of optimal programs among all the television programs are listed for each individual, comprising:

subscriber taste evaluating means for obtaining subscriber taste data from a questionnaire;

television program evaluating means for obtaining television program data;

linear programming means for obtaining optimal program list data according to said subscriber taste data and television program data;

means for storing said optimal program list data into a hard disc;

means for printing out an individual television program list from said stored data in the hard disc;

feedback means for inputting subscriber's complaints against said printed out program list, thereby to improve prediction reliability of a subsequent program list;

a personal computer at the location of the subscriber; and bi-directional communication means for informing a computer center of subscriber's complaints stored in said personal computer against an individual television program list through a telephone line or the like, and sending out through the telephone line or the like to the subscriber a new individual television program list provided according to said complaints.

2. A method for providing an individual television program list, wherein television channels and corresponding time intervals of optimal programs among all the television programs are listed for each individual subscriber, comprising the steps of;

obtaining subscriber taste data from a questionnaire;

obtaining television program data by evaluating said subscriber taste data;

using linear programming to obtain optimal program list data according to said subscriber taste data and said television program data;

storing said optimal program list data on a hard disk;

printing out an individual television list from said stored storing a subscriber's complaints in a personal computer at the location of the subscriber;

inputting a subscriber's complaints about said printed out program list obtained from said personal computer to improve prediction reliability of a subsequent program list; and using a telephone line or the like, establishing bidirectional communications between the subscriber and a computer center for informing said computer center of said subscriber's complaints against a particular individual program list, and through said bidirectional communications link, automatically operating linear programming and sending from the computer center to the subscriber a new and more reliable individual television program list revised according to said complaints.

* * * * *